(12) United States Patent
Liao et al.

(10) Patent No.: US 6,573,902 B1
(45) Date of Patent: Jun. 3, 2003

(54) APPARATUS AND METHOD FOR CACHE MEMORY CONNECTION OF TEXTURE MAPPING

(75) Inventors: Ming-Hao Liao, Hsinchu (TW); Hung-Ta Pai, Hsinchu (TW)

(73) Assignee: Silicon Integrated Systems Corporation, Hsin-Chu (TW)

(*) Notice: Subject to any disclaimer, the term of this patent is extended or adjusted under 35 U.S.C. 154(b) by 0 days.

(21) Appl. No.: 09/531,035

(22) Filed: Mar. 20, 2000

(51) Int. Cl.[7] .............................. G06T 11/40; G09G 5/36
(52) U.S. Cl. ........................ 345/552; 345/557; 345/582
(58) Field of Search ................................ 345/582–588, 345/552, 557

(56) References Cited

U.S. PATENT DOCUMENTS

| | | | | |
|---|---|---|---|---|
| 5,706,481 A | * | 1/1998 | Hannah et al. ............. | 345/503 |
| 6,002,410 A | * | 12/1999 | Battle ......................... | 345/552 |
| 6,233,647 B1 | * | 5/2001 | Bentz et al. ................. | 345/557 |
| 6,288,730 B1 | * | 9/2001 | Duluk et al. ................ | 345/428 |
| 6,339,428 B1 | * | 1/2002 | Fowler et al. .............. | 345/582 |
| 6,353,438 B1 | * | 3/2002 | Van Hook et al. .......... | 345/540 |
| 6,389,504 B1 | * | 5/2002 | Tucker et al. ............... | 345/552 |

* cited by examiner

*Primary Examiner*—Ulka J. Chauhan
(74) *Attorney, Agent, or Firm*—Ladas & Parry

(57) ABSTRACT

The present invention discloses an apparatus and method for cache memory connection of texture mapping, applied in a computer graphic processing system by storing image texels in cache memories. The apparatus comprises a plurality of cache memories. An array of image texels are stored in a plurality of cache memories to reduce the area occupied by cache memories of the computer graphic processing system. Besides, the apparatus and method of the present invention can be applied in the well-known mapping methods: selecting the nearest point, bilinear filtering and trilinear filtering. A plurality of multiplexers are used to reorganize the plurality of cache memories so as to increase the utilization efficiency of the apparatus of the present invention.

5 Claims, 9 Drawing Sheets

APPARATUS AND METHOD FOR CACHE MEMORY CONNECTION OF TEXTURE MAPPING

BACKGROUND OF THE INVENTION

1. Field of the Invention

The present invention relates to an apparatus and method of cache memory connection stores image texels, and particularly to an apparatus and method for reducing area occupied and cost of cache memories by a special texture mapping process.

2. Description of the Related Art

Texture mapping is important for a 3D computer graphic processing system because it riches the visual effect of a rendering process. However, the texture mapping process needs to access a lot of texels in a DRAM. If the bandwidth of the DRAM is inadequate, the speed of texture mapping will slow down.

Figure 1:
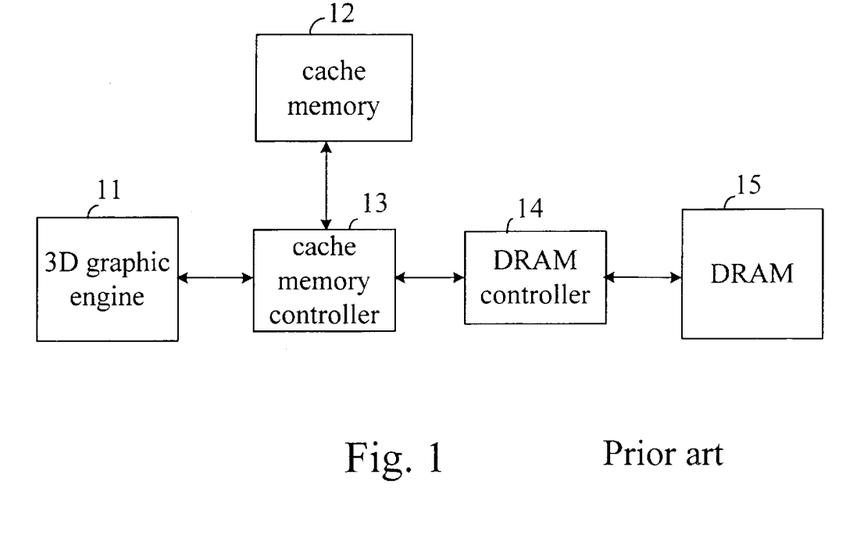
FIG. 1 is a structural diagram of a 3D computer graphic processing system.

Nowadays in industries, a cache memory is used to resolve the problem of the bandwidth inadequacy when the DRAM is used. FIG. 1 is a structural diagram of a 3D computer graphic processing system, wherein a 3D graphic engine 11 is a kernel device for executing the rendering process, accesses a DRAM 15 through a DRAM controller 14 and accesses a cache memory 12 through a cache controller 13. Besides, the speed of the cache memory 12 is much faster than the speed of DRAM 15. In texture mapping, a pixel accessed by the 3D graphic engine 11 corresponds to a plurality of texels inside the cache memory 12 and DRAM 15. Firstly, the 3D graphic engine 11 reads the texels stored in the cache memory 12 through the cache controller 13. The texels correspond to the pixel being displayed. If the texels are not inside the cache memory 12, the 3D graphic engine 11 reads texels corresponding to the pixel being displayed from the DRAM 15 through the DRAM controller 14, and saves the texels in the cache memory 12.

The performance of the cache memory 12 depends on a parameter named hit ratio. The higher the value of the parameter is, the higher the performance of the cache memory 12 is. A well-known method for improving the hit ratio is to increase the quantity of the cache memory 12, but this method will increase the area occupied and cost of the cache memory 12.

Besides, there are three main methods of texture mapping. They are a method of selecting nearest point, a method of bilinear filtering and a method of trilinear filtering respectively. The mapping method of selecting the nearest point makes one pixel correspond to one texel. The mapping method of bilinear filtering makes one pixel correspond to four texels, and the attribute value of the pixel is determined by interpolating the attribute values of the four texels. The mapping method of trilinear filtering makes one pixel correspond to eight texels, and the eight texels can be divided into odd layers and even layers. Each of the odd layers and even layers includes four texels to generate a 3D effect. The attribute value of the pixel is determined by interpolating the attribute values of the eight texels when the mapping method of trilinear filtering is used. Currently, the most popular and important method of texture mapping is the mapping method of trilinear filtering because of the reality of the visual effect.

Nowadays in the industries, the eight texels needed by the mapping method of trilinear filtering are obtained from a cache memory having eight data ports to complete eight-texel input or output in one cycle. Generally, the area occupied by a 4M-byte cache memory with eight data ports is about two times of the area occupied by two 2M-byte cache memories with four data ports, or about four times of the area occupied by four 1M-byte cache memories with two data ports. Therefore the cost and area occupied by the prior single cache memory is very large. Besides, the 3D graphic engine 11 usually processes two or more pixels simultaneously in one cycle time to speed up the action of display, or processing two or more textures simultaneously in one cycle time to enhance the visual effect. The prior art in dealing with multiple pixels or multiple textures accessed in one cycle is to use a cache memory 12 with a lot of data ports, and that is not economical enough.

As mentioned above, the current apparatus and method about cache memory connection for texture mapping do not meet the need by the market.

SUMMARY OF THE INVENTION

Accordingly, the object of the present invention is to resolve the drawbacks of large area occupied and large cost in prior art. In order to accomplish the object, the present invention proposes a new cache memory apparatus and method for connecting cache memories for texture mapping. The cache memory apparatus for texture mapping is applied in a computer graphic processing system for storing an array of image texels, which form at least one texture. The cache memory apparatus for texture mapping comprises a plurality of cache memories, each of said cache memories storing a part of the image texels according to the row number of said array of the image texels respectively so as to reduce the area occupied by the cache memories of the computer graphic processing system. Besides, the texels contained in the plurality of cache memories are the same with the texels contained in the prior single cache memory, so the parameter of hit ratio will not be decreased. Furthermore, the texels stored in the cache memory apparatus of the present invention are arranged properly, so there would not be any conflict due to the decrease of data ports of the cache memory apparatus of the present invention. Therefore, the cache memory apparatus of the present invention will complete all texel access in one cycle time. Furthermore, the cache memory apparatus of the present invention can be applied in the well-known mapping method: selecting a nearest point, bilinear filtering and trilinear filtering. When the present invention is used to deal with the mapping methods of selecting the nearest point and bilinear filtering, a plurality of multiplexers are used to reorganize the structure of cache memories in the present invention to increase the utilization efficiency of cache memory apparatus of the present invention. When the present invention is used to deal with the mapping method of accessing one texture and trilinear filtering, the cache memory apparatus proposed for texture mapping comprises the first to fourth cache memories. The first cache memory is used to store the content of odd rows of odd layer of the image texels, the second cache memory is used to store the content of even rows of odd layer of the image texels, the third cache memory is used to store the content of odd rows of even layer of the image texels, and the fourth cache memory is used to store the content of even rows of even layer of the image texels.

The present invention can also be used when the mapping method of multiple textures and multiple pixels are used. When the present invention is used to deal with the mapping method of accessing K textures and trilinear filtering, the apparatus proposed comprises the first to 4K-th cache memories. The first cache memory is used to store the content of odd rows of odd layer of the first texture of the array of the image texels, the second cache memory is used to store the content of even rows of odd layer of the first texture of the array of the image texels, the third cache memory is used to store the content of odd rows of even layer of the first texture of said array of the image texels, and the fourth cache memory is used to store the content of even rows of even layer of the first texture of said array of the image texels. By the same rule, the (4K–3)-th cache memory is used to store the content of odd rows of odd layer of the K-th texture of said array of the image texels, the (4K–2)-th cache memory is used to store the content of even rows of odd layer of the K-th texture of said array of the image texels, the (4K–1)-th cache memory is used to store the content of odd rows of even layer of the K-th texture of said array of the image texels, and the 4K-th cache memory is used to store the content of even rows of even layer of the K-th texture of said array of the image texels, and K is a positive integer which is bigger than one. When the present invention uses the mapping method of accessing G pixels simultaneous, each cache memory of the present invention will have 2G data ports, and G is a positive integer.

BRIEF DESCRIPTION OF THE DRAWINGS

The invention will be described according to the appended drawings in which.

PREFERRED EMBODIMENT OF THE PRESENT INVENTION

Figure 2:
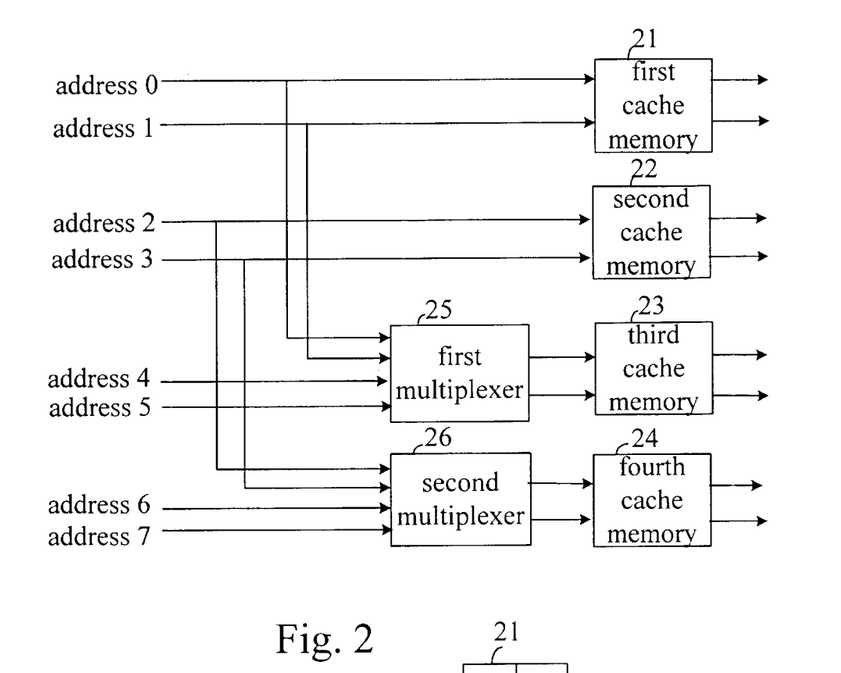
FIG. 2 is a schematic diagram of cache memories which implement a mapping method through a single pixel and single texture according to the first preferred embodiment of the present invention.

FIG. 2 is a schematic diagram of cache memories which implement a mapping method through a single pixel and single texture according to the first preferred embodiment of the present invention. The schematic diagram divides the prior single cache memory into four smaller cache memories with one fourth memory size of prior single cache memory and one fourth number of data ports of prior single cache memory, and the four smaller cache memories are named as a first cache memory 21, a second cache memory 22, a third cache memory 23 and a fourth cache memory 24. The input end is addresses 0 to 7, wherein address 0 is the address line of the first texel, by the same rule, address 7 is the address line of the eighth texel because one pixel is corresponding to eight texels at most in the major mapping methods of selecting the nearest point, bilinear filtering and trilinear filtering. There is a first multiplexer 25 between the third cache memory 23 and the input address end a second multiplexer 26 between the fourth cache memory 24 and the input address end. When the mapping method is selecting the nearest point or bilinear filtering, the first multiplexer 25 selects address 0 and address 1 as the address lines of the third cache memory 23, and the second multiplexer 26 selects address 2 and address 3 as the address lines of the fourth cache memory 24. The above-mentioned fact is the same with the situation that the first cache memory 21 is cascaded with the third cache memory 23 and the second cache memory 22 is cascaded with the fourth cache memory 24. When the mapping method is trilinear filtering, the first multiplexer 25 selects address 4 and address 5 as the address lines of the third cache memory 23, and the second multiplexer 26 selects address 6 and address 7 as the address lines of the fourth cache memory 24. The area occupied by the cache memories in FIG. 2 is one fourth of the area occupied by the prior single cache memory 12.

Figure 3:
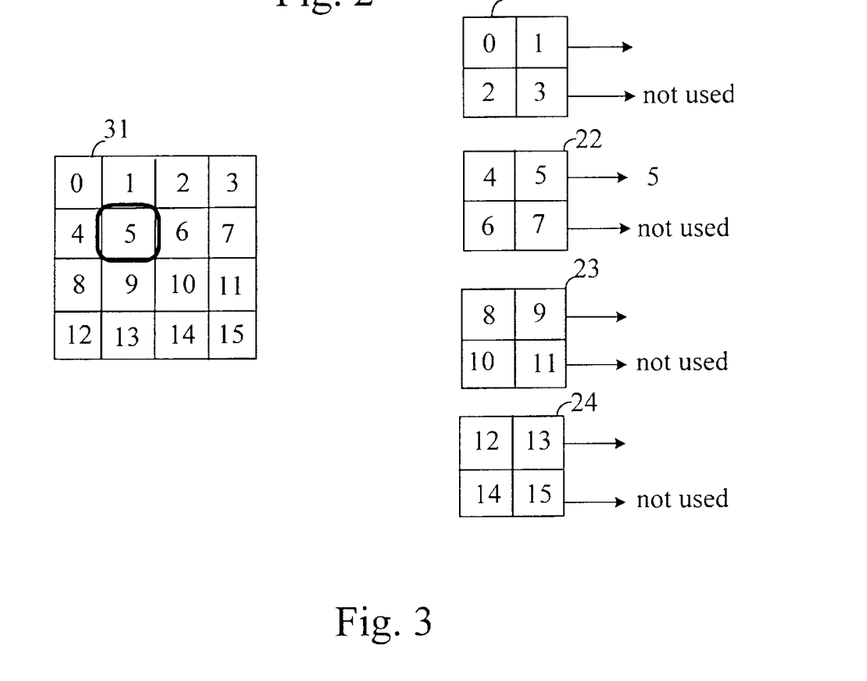
FIG. 3 is a schematic diagram of cache memories which implement a mapping method through a single pixel, single texture and selecting the nearest point according to the second preferred embodiment of the present invention.

FIG. 3 is a schematic diagram of cache memories which implement a mapping method through a single pixel, single texture and selecting the nearest point according to the second preferred embodiment of the present invention. Suppose that the whole texels of an image stored in the DRAM 15 includes at least the content of a texel array 31, the first cache memory 21 includes at least the content of the first row of the texel array 31, the second cache memory 22 includes at least the content of the second row of the texel array 31, the third cache memory 23 includes at least the content of the third row of the texel array 31, and the fourth cache memory 24 includes at least the content of the fourth row of the texel array 31. The mapping method of the texel array 31 from the first to fourth cache memories are conducted according to odd and even rows but not odd and even columns. This is because the bit width of the first to fourth cache memories are bigger than the bit width of a texel, and if the mapping method is conducted according to columns, the texels stored therein will be overlapped and therefore the performance will be reduced. The mapping method of selecting the nearest point makes one pixel correspond to one texel. As illustrated by the example of FIG. 3 if a texel 5 in the texel array 31 is read from the 3D graphic engine 11, then the texel are outputted from the second cache memory 22, which stores the content of the second row of the texel array 31. It should be noticed that only one of the first to fourth cache memories will output texels when the mapping method of selecting the nearest point is conducted. Therefore, the first multiplexer 25 is used to cascade the first cache memory 21 and the third cache memory 23, and the second multiplexer 26 is used to cascade the second cache memory 22 and the fourth cache memory 24 to increase the utilization efficiency of the first to fourth cache memories.

Figure 4:
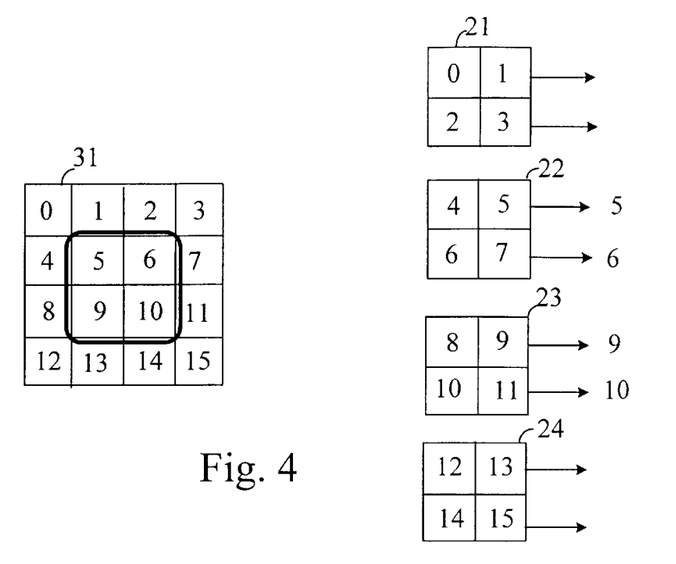
FIG. 4 is a schematic diagram of cache memories which implement a mapping method through a single pixel, single texture and bilinear filtering according to the third preferred embodiment of the present invention.

FIG. 4 is a schematic diagram of cache memories which implement a mapping method through a single pixel, single texture and bilinear filtering according to the third preferred embodiment of the present invention. The storing method of texels of bilinear filtering is the same with that of selecting the nearest point from the first to fourth cache memories. The mapping method of bilinear filtering makes one pixel correspond to four texels. As shown by the example in FIG. 4, the neighboring texels 5, 6, 9 and 10 of the texel array 31 are read from the 3D graphic engine 11. Then, texels 5 and 6 are outputted from the second cache memory 22, which stores the content of the second row of the texel array 31, and texels 9 and 10 are outputted from the third cache memory 23, which stores the content of the third row of the texel array 31. It should be noted that only two cache memories of the first to fourth cache memories will output texels by the mapping method of bilinear filtering. Therefore, the first multiplexer 25 can be used to cascade the first cache memory 21 and the third cache memory 23, and the second multiplexer 26 can be used to cascade the second cache memory 22 and the fourth cache memory 24, so as to increase the utilization efficiency of the first to fourth cache memories.

Figure 5:
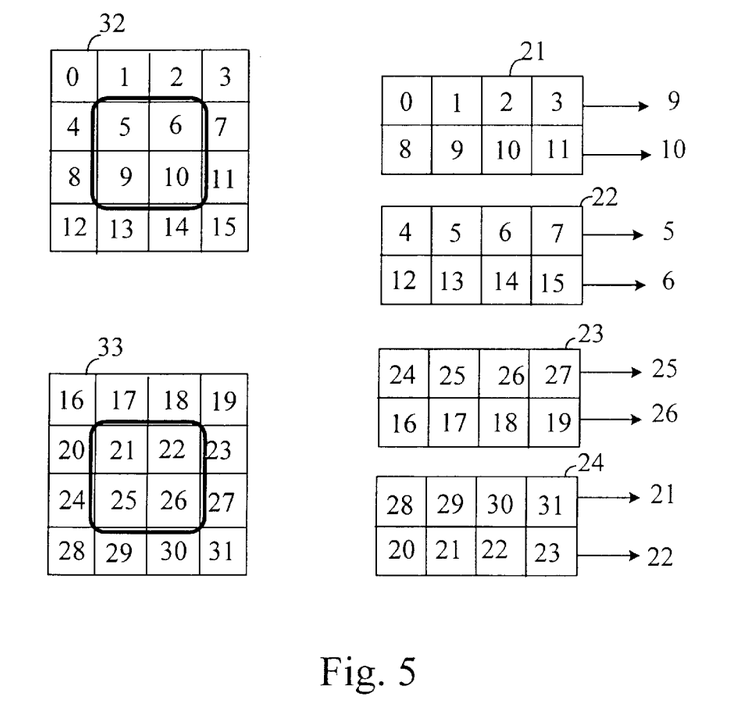
FIG. 5 is a schematic diagram of cache memories which implement a mapping method through a single pixel, single texture and trilinear filtering according to the fourth preferred embodiment of the present invention.

FIG. 5 is a schematic diagram of cache memories which implement a mapping method through a single pixel, single texture and trilinear filtering according to the fourth preferred embodiment of the present invention. If the whole texels of an image stored in the DRAM 15 includes at least the content of the texel array of a odd layer 32 and the content of the texel array of a even layer 33, the first cache memory 21 includes at least the content of the odd rows of the texel array of the odd layer 32, the second cache memory 22 includes at least the content of the even rows of the texel array of the odd layer 32, the third cache memory 23 includes at least the content of the odd rows of the texel array of the even layer 33, and the fourth cache memory 24 includes at least the content of the even rows of the texel array of the even layer 33. The mapping method of trilinear filtering makes one pixel correspond to eight texels. As shown by the example in FIG. 5, in which the texels 5, 6, 9 and 10 of the texel array of the odd layer 32 and texels 21, 22, 25 and 26 of the texel array of the even layer 33 are read from the 3D graphic engine 11, then texels 5 and 6 are outputted from the second cache memory 22, which stores the content of the second row of the texel array of the odd layer 32, texels 9 and 10 are outputted from the second cache memory 22, which stores the content of the third row of the texel array of the odd layer 32, texels 21 and 22 are outputted from the fourth cache memory 24, which stores the content of the second row of the texel array of the even layer 33, and texels 25 and 26 are outputted from the third cache memory 23, which stores the content of the third row of the texel array of the even layer 33. It should be noted that every one of the first to fourth cache memories will output texels when the mapping method of trilinear filtering is used.

Figure 6:
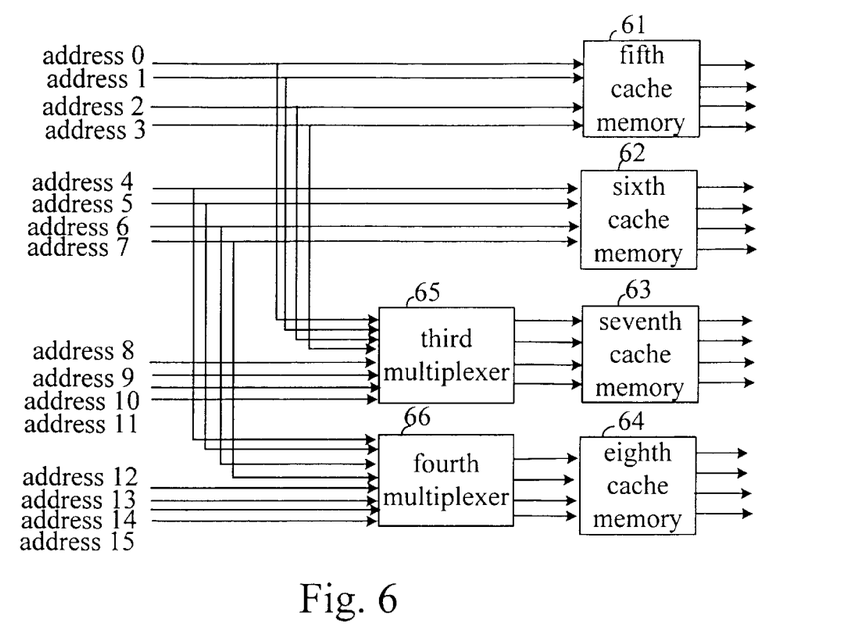
FIG. 6 is a schematic diagram of cache memories which implement a mapping method through double pixels and single texture according to the fifth preferred embodiment of the present invention.

FIG. 6 is a schematic diagram of cache memories which implement a mapping method through double pixels and single texture according to the fifth preferred embodiment of the present invention. Because two neighboring pixels are read simultaneously by the 3D graphic engine 11, the number of data ports of the fifth to eighth cache memories 61–64 is four, which is bigger than the number of data ports of the cache memories 21–24 in FIG. 2. Input ends are addresses 0 to 15, wherein addresses 0–15 correspond to the address lines of the first to sixteen texels because two pixels correspond to sixteen texels at most in the three major mapping methods: selecting the nearest point, bilinear filtering and trilinear filtering. A third multiplexer 65 is connected between the seventh cache memory 63 and the input address ends, and a fourth multiplexer 66 is between the eighth cache memory 64 and the input address ends. When the mapping method is the method of selecting the nearest point or bilinear filtering, the third multiplexer 65 selects addresses 0 to 3 as the address lines of the seventh cache memory 63, and the fourth multiplexer 66 selects addresses 4 to 7 as the address lines of the eighth cache memory 64. These selection is equivalent to the situation that the fifth cache memory 61 is cascaded with the seventh cache memory 63 and the sixth cache memory 62 is cascaded with the eighth cache memory 64. When the mapping method is trilinear filtering, the third multiplexer 65 selects addresses 8 to 11 as the address lines of the seventh cache memory 63, and the fourth multiplexer 66 selects addresses 12 to 15 as the address lines of the eighth cache memory 64. The area occupied by the cache memories in FIG. 6 is one fourth of the area occupied by the prior single cache memory 12.

Figure 7:
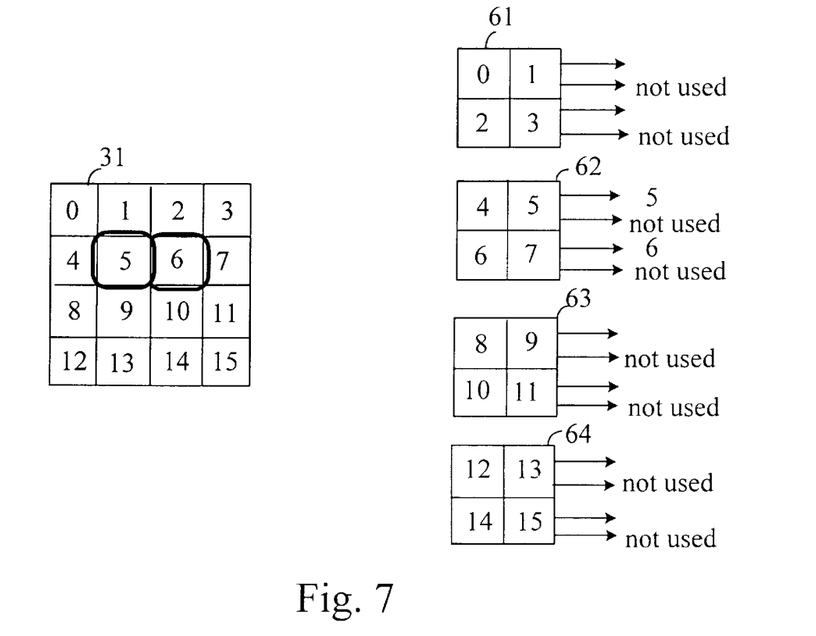
FIG. 7 is a schematic diagram of cache memories which implement a mapping method through double pixels, single texture and selecting the nearest point according to the sixth preferred embodiment of the present invention.

FIG. 7 is a schematic diagram of cache memories which implement a mapping method through double pixels, single texture and selecting the nearest point according to the sixth preferred embodiment of the present invention. If the whole texels of an image stored in the DRAM 15 includes at least the content of a texel array 31, the fifth cache memory 61 includes at least the content of the first row of the texel array 31, the sixth cache memory 62 includes at least the content of the second row of the texel array 31, the seventh cache memory 63 includes at least the content of the third row of the texel array 31, and the eighth cache memory 64 includes at least the content of the fourth row of the texel array 31. The mapping method of the texel array 31 stored in the fifth to eighth cache memories 61–64 is conducted according to odd or even rows but not odd or even columns, because the bit width of the fifth to eighth cache memories is bigger than the bit width of a texel, and if conducted according to columns, the texels stored will be overlapped and therefore the performance will be reduced. The mapping method of selecting the nearest point makes one pixel correspond to one texel. As shown by the example in FIG. 7 in which the texels 5 and 6 of the texel array 31 are read from the 3D graphic engine 11. Then, they are outputted from the sixth cache memory 62, which stores the content of the second row of the texel array 31. It should be noted that only one of the fifth to eighth cache memories will output texels when the mapping method of selecting the nearest point. Therefore, the third multiplexer 65 can be used to cascade the fifth cache memory 61 and the seventh cache memory 63, and the fourth multiplexer 66 can be used to cascade the sixth cache memory 62 and the eighth cache memory 64, so as to increase the utilization efficiency of the fifth to eighth cache memories 61–64.

Figure 8:
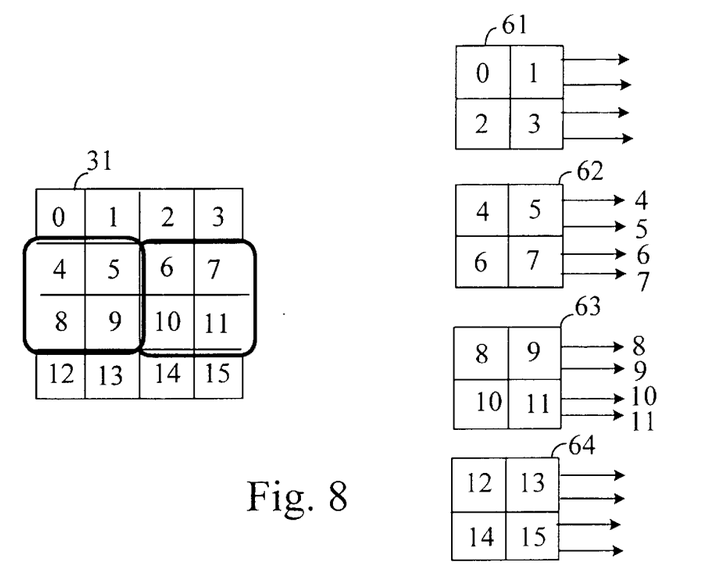
FIG. 8 is a schematic diagram of cache memories which implement a mapping method through double pixels, single texture and bilinear filtering according to the seventh preferred embodiment of the present invention.

FIG. 8 is a schematic diagram of cache memories which implement a mapping method through double pixels, single texture and bilinear filtering according to the seventh preferred embodiment of the present invention. The storing method of texels of bilinear filtering is the same with that of selecting the nearest point in the fifth to eighth cache memories. The mapping method of bilinear filtering makes one pixel correspond to four texels. As shown by the example in FIG. 8, in which the neighboring texels 4, 5, 8, 9, 6, 7, 10 and 11 of the texel array 31 are read from the 3D graphic engine 11. Then texels 4, 5, 6 and 7 are outputted from the sixth cache memory 62, which stores the content of the second row of the texel array 31 and the texels 8, 9, 10 and 11 are outputted from the seventh cache memory 63, which stores the content of the third row of the texel array 31. It should be noted that only two cache memories of the fifth to eighth cache memories will output texels by the mapping method of bilinear filtering. Therefore, the third multiplexer 65 can be used to cascade the fifth cache memory 61 and the seventh cache memory 63, and the fourth multiplexer 66 can be used to cascade the sixth cache memory 62 and the eighth cache memory 64, so as to increase the utilization efficiency of the fifth to eighth cache memories.

Figure 9:
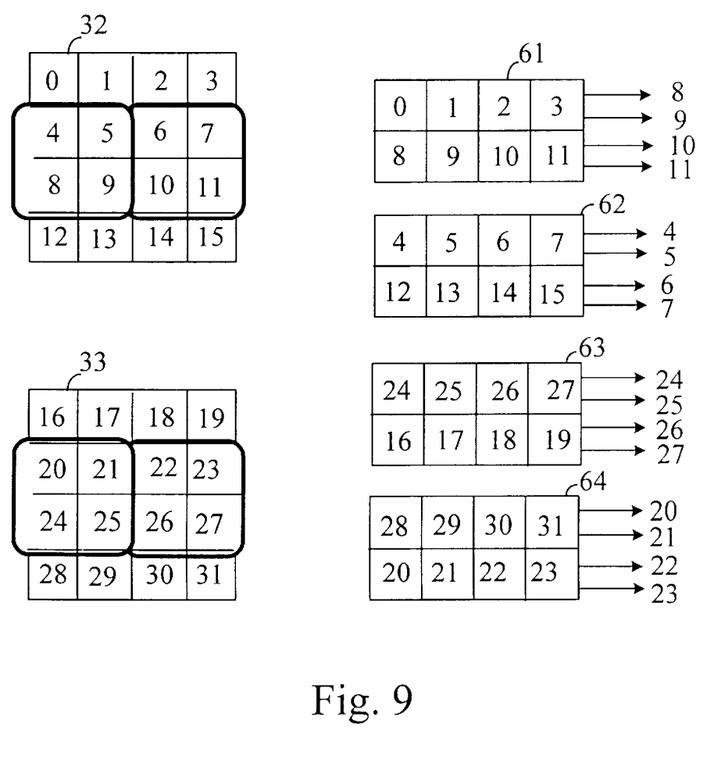
FIG. 9 is a schematic diagram of cache memories which implement a mapping method through double pixels, single texture and trilinear filtering according to the eighth preferred embodiment of the present invention.

FIG. 9 is a schematic diagram of cache memories which implement a mapping method through double pixels, single texture and trilinear filtering according to the eighth preferred embodiment of the present invention. If the whole texels of an image stored in the DRAM 15 includes at least the content of the texel array of the odd layer 32 and the content of the texel array of the even layer 33, the fifth cache memory 61 includes at least the content of the odd rows of the texel array of the odd layer 32, the sixth cache memory 62 includes at least the content of the even rows of the texel array of the odd layer 32, the seventh cache memory 63 includes at least the content of the odd rows of the texel array of the even layer 33, and the eighth cache memory 64 includes at least the content of the even rows of the texel array of the even layer 33. The mapping method of trilinear filtering makes one pixel correspond to eight texels. As shown by the example in FIG. 9, in which the neighboring texels 4, 5, 8, 9, 6, 7, 10 and 11 of the texel array of the odd layer 32 and the neighboring texels 20, 21, 24, 25, 22, 23, 26 and 27 of the texel array of the even layer 33 are read from the 3D graphic engine 11. The texels 4, 5, 6 and 7 are outputted from the sixth cache memory 62, which stores the content of the second row of the texel array of the odd layer 32. The texels 8, 9, 10 and 11 are outputted from the fifth cache memory 61, which stores the content of the third row of the texel array of the odd layer 32. The texels 20, 21, 22 and 23 are outputted from the eighth cache memory 64, which stores the content of the second row of the texel array of the even layer 33. The texels 24, 25, 26 is and 27 are outputted from the seventh cache memory 63, which stores the content of the third row of the texel array of the even layer 33. It should be noted that every cache memory of the fifth cache memory to eighth cache memory will output texels by the mapping method of trilinear filtering.

Figure 10:
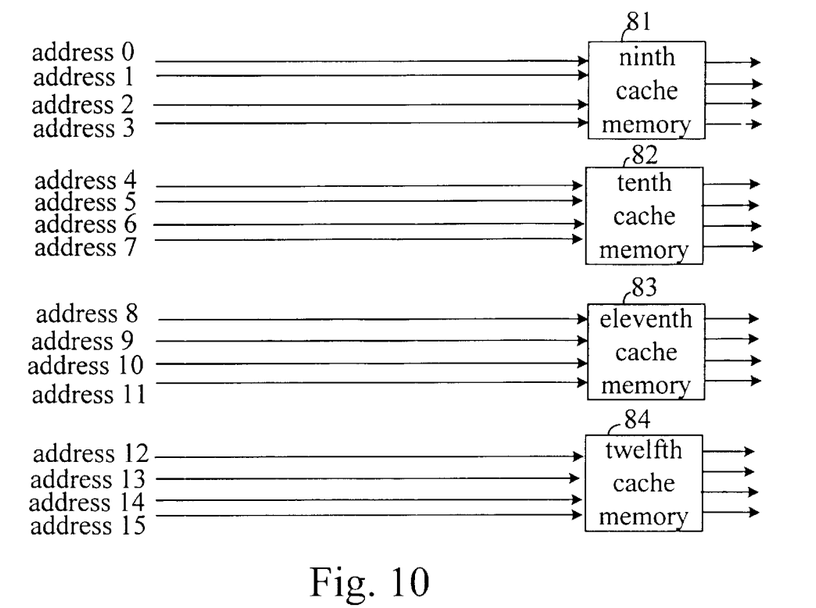
FIG. 10 is a schematic diagram of cache memories which implement a mapping method through double pixels and double textures according to the ninth preferred embodiment of the present invention.

FIG. 10 is a schematic diagram of cache memories which implement a mapping method through double pixels and double textures according to the ninth preferred embodiment of the present invention. Textures are patterns on the surface of an object. If the textures are used in image processing, the visual effect will be enhanced. Because two neighboring pixels are read simultaneously by the 3D graphic engine and every pixel has two textures, the number of data ports of the ninth to twelfth cache memories 81–84 is four, wherein the texels of the first texture are stored in the ninth 81 and the tenth cache memories 82, and the texels of the second texture are stored in the eleventh 83 and the twelfth cache memories 84. Input ends are addresses 0 to 15, wherein address 0–15 correspond to the address line of the first to sixteenth texels or the seventeenth to 32-th texels because double pixels and double textures correspond to 32 texels at most in three major mapping methods: selecting the nearest point, bilinear filtering and trilinear filtering. Because 16 texels are used at most when the mapping methods of selecting the nearest point and bilinear filtering are used and the mapping method through double pixels and double textures, the texels stored in the ninth to twelfth cache memories 81–84 can be read in one cycle by address 0 corresponding to the first texel to address 15 corresponding to the sixteenth texel. Because 32 texels are used at most when the mapping method of trilinear filtering is used, double pixels and double textures, the texels stored in the ninth to twelfth cache memories can be read in two cycles according to the structure in FIG. 10. In the first cycle, the texels stored in the ninth to twelfth cache memories are read from address 0 corresponding to the first texel to address 15 corresponding to the sixteenth texel. In the second cycle, the texels stored in the ninth to twelfth cache memories 81–84 are read from address 0 corresponding to the 17-th texel to address 15 corresponding to the 32-th texel. The number of cache memories can be scaled up by the structure in FIG. 10 to fit the situation that more than two textures are accessed simultaneously. For example, six cache memories are used for the mapping method of three textures, eight cache memories are used for the mapping method of four textures, and so on.

Figure 11:
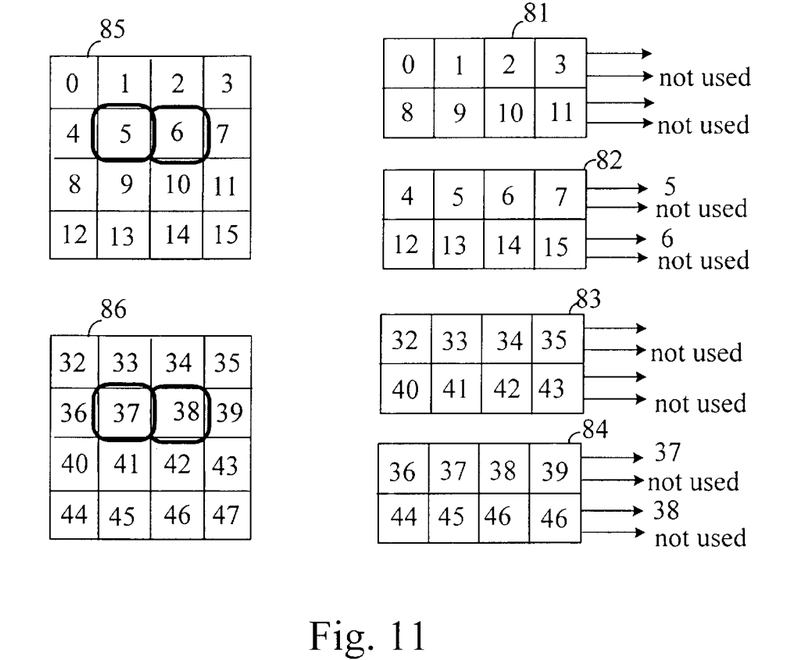
FIG. 11 is a schematic diagram of cache memories which implement a mapping method through double pixels, double textures and selecting the nearest point according to the tenth preferred embodiment of the present invention.

FIG. 11 is a schematic diagram of cache memories which implement a mapping method through double pixels, double textures and selecting the nearest point according to the tenth preferred embodiment of the present invention. If the whole texels of an image stored in the DRAM 15 includes at least the content of the texel array 85 of a first texture and the content of the texel array 86 of a second texture, the ninth cache memory 81 includes at least the content of the odd rows of the texel array 85 of the first texture, the tenth cache memory 82 includes at least the content of the even rows of the texel array 85 of the first texture, the eleventh cache memory 83 includes at least the content of the odd rows of the texel array 86 of the second texture, and the twelfth cache memory 84 includes at least the content of the even rows of the texel array 86 of the second texture. The mapping method of the texel array in the ninth to twelfth cache memories 81–84 is conducted according to odd and even rows but not odd and even columns, because the bit width of the ninth to twelfth cache memories 81–84 is bigger than the bit width of a texel, and if conducted according to columns, the texels stored will be overlapped and therefore the performance will be reduced. The mapping method of selecting the nearest point makes one pixel correspond to one texel. As shown by the example in FIG. 11, in which the texels 5 and 6 of the first texture 85 and texels 37 and 38 of the second texture 86 are read from the 3D graphic engine 11, the texels 5 and 6 are outputted from the ninth cache memory 81, which stores the content of the odd rows of the texel array 85 of the first texture, and the texels 37 and 38 are outputted from the twelfth cache memory 84, which stores the content of the odd rows of the texel array 86 of the second texture. It should be noted that only two of the ninth to twelfth cache memories 81–84 will output texels by the mapping method of selecting the nearest point.

Figure 12:
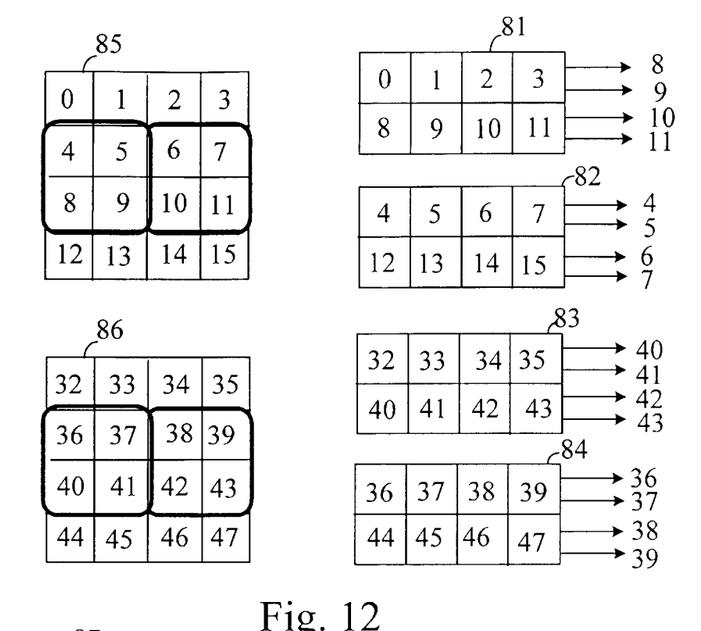
FIG. 12 is a schematic diagram of cache memories which implement a mapping method through double pixels, double textures and bilinear filtering according to the eleventh preferred embodiment of the present invention.

FIG. 12 is a schematic diagram of cache memories which implement a mapping method through double pixels, double textures and bilinear filtering according to the eleventh preferred embodiment of the present invention. The storing method of texels of bilinear filtering is the same with that of selecting the nearest point in the ninth to twelfth cache memories. The mapping method of bilinear filtering makes one pixel correspond to four texels. As shown by the example in FIG. 12, in which the neighboring texels 4, 5, 8, 9, 6, 7, 10, and 11 of the texel array 85 of the first texture and the neighboring texels 36, 37, 40, 41, 38, 39, 42, and 43 of the texel array 86 of the second texture are read from the 3D graphic engine 11, the texels 8, 9, 10, and 11 are outputted from the ninth cache memory 81, which stores the content of the odd rows of the texel array 85 of the first texture, the texels 4, 5, 6, and 7 are outputted from the tenth cache memory 82, which stores the content of the even rows of the texel array 85 of the first texture, texels 40, 41, 42, and 43 are outputted from the eleventh cache memory 83, which stores the content of the odd rows of the texel array 86 of the second texture, and texels 36, 37, 38, and 39 are outputted from the twelfth cache memory 84, which stores the content of the even rows of the texel array 86 of the second texture. It should be noted that every cache memory of the ninth to twelfth cache memories 81–84 will output texels by the mapping method of bilinear filtering. Therefore, it is not necessary to use a plurality of multiplexers as illustrated in FIG. 6.

Figure 13A:
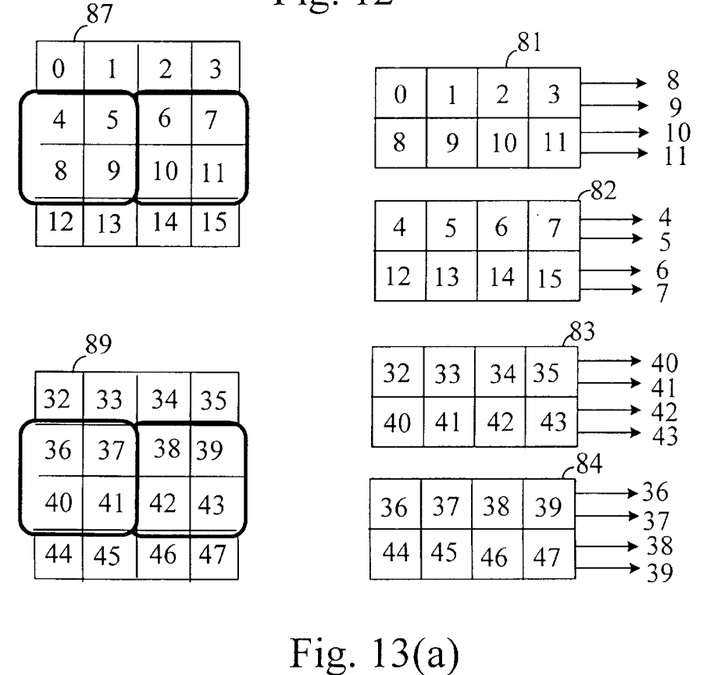
FIG. 13(a) is a schematic diagram of cache memories which implement a mapping method through double pixels, double textures and trilinear filtering in the first cycle time according to the twelfth preferred embodiment of the present invention.

FIG. 13(a) is a schematic diagram of cache memories which implement a mapping method through double pixels, double textures and trilinear filtering in the first cycle time according to the twelfth preferred embodiment of the present invention. If the whole texels of an image stored in the DRAM 15 includes at least the content of the texel array 87 of odd layer of the first texture, the content of the texel array 88 of even layer of the first texture, the content of the texel array 89 of odd layer of the second texture and the content of the texel array 90 of even layer of the second texture, the ninth cache memory 81 includes at least the content of the odd rows of the texel array 87 of the odd layer and the even layer 88 of the first texture, the tenth cache memory 82 includes at least the content of the even rows of the texel array 87 of the odd layer and the texel array 88 of even layer of the first texture, the eleventh cache memory 83 includes at least the content of the odd rows of the texel array 89 of the odd layer and the texel array 90 of even layer of the second texture, and the twelfth cache memory 84 includes at least the content of the even rows of the texel array 89 of the odd layer and the texel array 90 of even layer of the second texture. The mapping method of trilinear filtering makes one pixel correspond to eight texels. As shown by the example in FIG. 13(a), in which the neighboring texels 4, 5, 8, 9, 6, 7, 10 and 11 of the texel array 87 of the odd layer and the neighboring texels 36, 37, 38, 39, 40, 41, 42, and 43 of the texel array 89 of odd layer of the second texture are read from the 3D graphic engine 11 in the first cycle, texels 8, 9, 10 and 11 are outputted from the ninth cache memory 81, which stores the content of the odd rows of the texel array 87 of odd layer of the first texture, the texels 4, 5, 6, and 7 are outputted from the tenth cache memory 82, which stores the content of the even rows of the texel array 87 of odd layer of the first texture, the texels 40, 41, 42, and 43 are outputted from the eleventh cache memory 83, which stores the content of the odd rows of the texel array 89 of odd layer of the second texture, and the texels 36, 37, 38, and 39 are outputted from the twelfth cache memory 84, which stores the content of the even rows of the texel array 89 of odd layer of the second texture. It should be noted that everyone of the ninth to twelfth cache memories 81–84 will output texels by the mapping method of trilinear filtering.

Figure 13B:
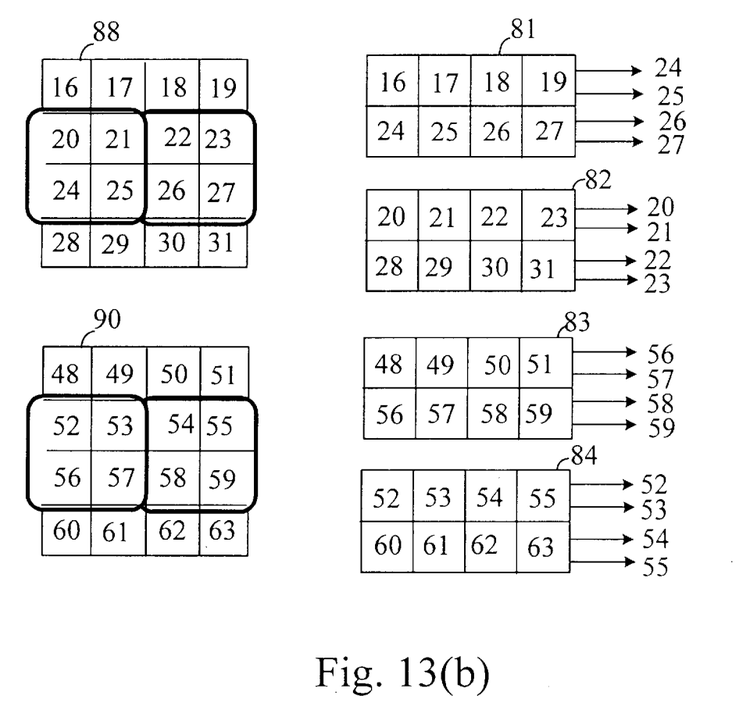
FIG. 13(b) is a schematic diagram of cache memories which implement a mapping method through double pixels, double textures and trilinear filtering in the second cycle time according to the twelfth preferred embodiment of the present invention.

FIG. 13(b) is a schematic diagram of cache memories which implement a mapping method through double pixels, double textures and trilinear filtering in the second cycle time according to the twelfth preferred embodiment of the present invention. The neighboring texels 20, 21, 22, 23, 24, 25, 26, 27, and 28 of the texel array 88 of even layer of the first texture and the neighboring texels 52, 53, 54, 55, 56, 57, 58, and 59 of the texel array 90 of even layer of the second texture are read from the 3D graphic engine 11 in the second cycle. The texels 24, 25, 26, and 27 are outputted from the ninth cache memory 81, which stores the content of the odd rows of the texel array 88 of even layer of the first texture. The texels 20, 21, 22 and 23 are outputted from the tenth cache memory 82, which stores the content of the even rows of the texel array 88 of even layer of the first texture, texels 56, 57, 58, and 59 are outputted from the eleventh cache memory 83, which stores the content of the odd rows of the texel array 90 of even layer of the second texture. The texels 52, 53, 54, and 55 are outputted from the twelfth cache memory 84, which stores the content of the even rows of the texel array 90 of even layer of the second texture.

Figure 14:
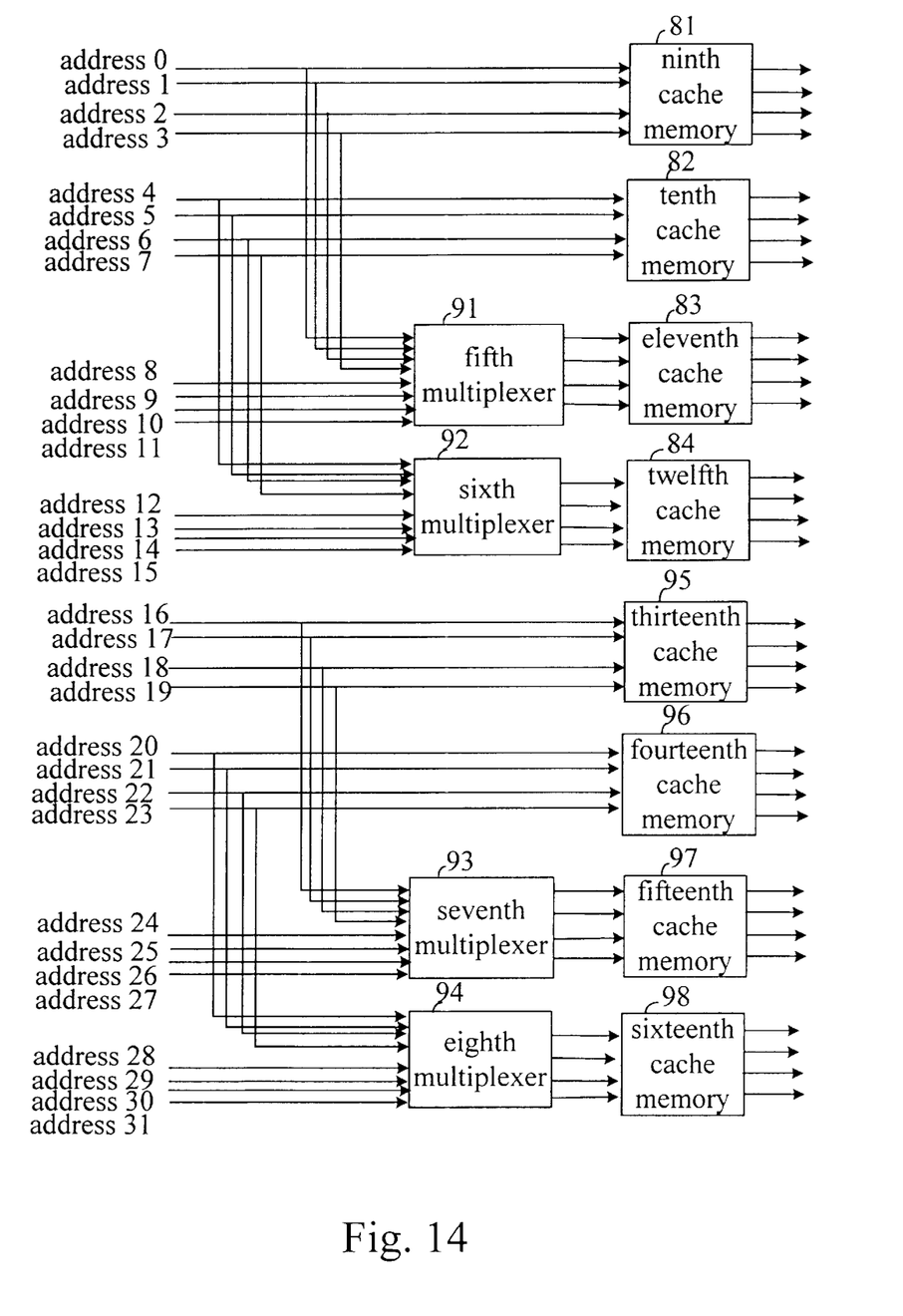
FIG. 14 is a schematic diagram of cache memories which implement a mapping method through double pixels and double textures according to the thirteenth preferred embodiment of the present invention.

FIG. 14 is a schematic diagram of cache memories which implement a mapping method through double pixels and double textures according to the thirteenth preferred embodiment of the present invention. This schematic diagram is formed by cascading two schematic diagrams of FIG. 6. Because two neighboring pixels are read simultaneously by the 3D graphic engine 11 and every pixel has two textures, the number of data ports of the ninth to sixteenth cache memories is four, wherein the texels of the first texture are stored in the ninth to twelfth cache memories 81–84, and the texels of the second texture are stored in the thirteenth to the sixteenth cache memories 95–98. Input ends are addresses 0 to 31, wherein addresses 0–31 correspond to the address line of the first to 32-th texel, because double pixels and double textures correspond to 32 texels at most in three major mapping methods: selecting the nearest point, bilinear filtering and trilinear filtering. Because 16 texels are used at most in the mapping method through double pixels, double textures and selecting the nearest point or bilinear filtering, the texels stored in the ninth to twelfth cache memories 81–84 and in the thirteenth to the sixteenth cache memories 95–98 can be read in one cycle from address 0 corresponding to the first texel to address 7 corresponding to the eighth texel and from address 16 corresponding to the 17-th texel to address 23 corresponding to the 24-th texel. Because 32 texels are used at most when the mapping method of trilinear filtering is used, double pixels and double textures, the texels stored in the ninth to the sixteenth cache memories 81–84 and 95–98 can be read in one cycle from address 0 corresponding to the first texel to address 31 corresponding to the 32-th texel. The present invention can also be implemented when the mapping method of three or more textures, just by scaling up the number of cache memories in FIG. 10. For example, twelve cache memories are used for the mapping method of three textures and double pixels, sixteen cache memories are used for the mapping method of four textures and double pixels, and so on.

Figure 15:
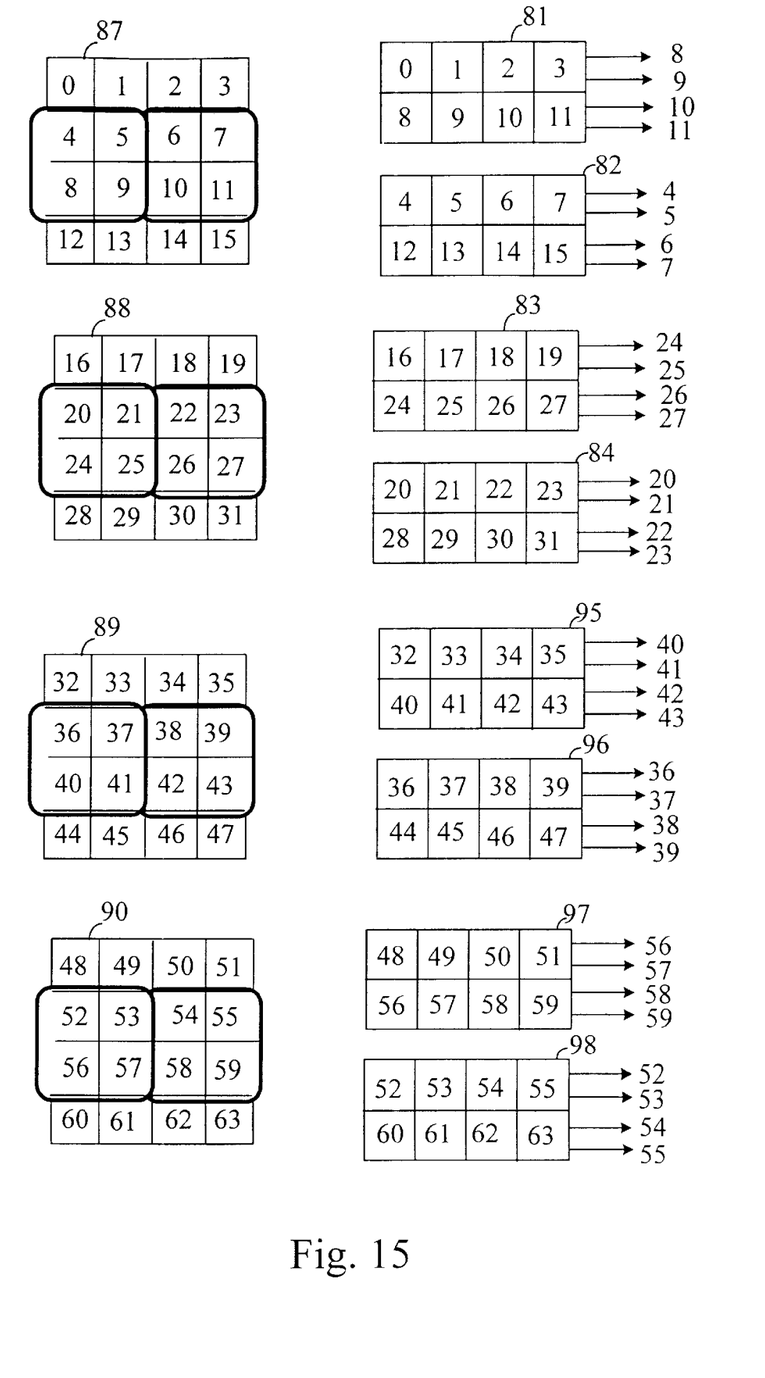
FIG. 15 is a schematic diagram of cache memories which implement a mapping method through double pixels, double textures and trilinear filtering according to the fourteenth preferred embodiment of the present invention.

FIG. 15 is a schematic diagram of cache memories which implement a mapping method through double pixels, double textures and trilinear filtering according to the fourteenth preferred embodiment of the present invention. If the whole texels of an image stored in the DRAM 15 includes at least the content of the texel array 87 of the odd layer and the texel array 88 of even layer of the first texture and the content of the texel array 89 of the odd layer and the texel array 90 of even layer of the second texture. The ninth cache memory 81 includes at least the content of the odd rows of the texel array 87 of odd layer of the first texture, the tenth cache memory 82 includes at least the content of the even rows of the texel array 87 of odd layer of the first texture, the eleventh cache memory 83 includes at least the content of the odd rows of the texel array 88 of even layer of the first texture, the twelfth cache memory 84 includes at least the content of the even rows of the texel array 88 of even layer of the first texture, the thirteenth cache memory 95 includes at least the content of the odd rows of the texel array 89 of odd layer of the second texture, the fourteenth cache memory 96 includes at least the content of the even rows of the texel array 89 of odd layer of the second texture, the fifteenth cache memory 97 includes at least the content of the odd rows of the texel array 90 of even layer of the second texture, and the sixteenth cache memory 98 includes at least the content of the even rows of the texel array 90 of even layer of the second texture. The mapping method of trilinear filtering makes one pixel correspond to eight texels. As shown by the example in FIG. 15, when the neighboring texels 4, 5, 8, 9, 6, 7, 10 and 11 of the texel array 87 of odd layer of the first texture, the neighboring texels 20, 21, 22, 23, 24, 25, 26, and 27 of the texel array 88 of even layer of the first texture, the neighboring texels 36, 37, 38, 39, 40, 41, 42, and 43 of the texel array 89 of odd layer of the second texture and the neighboring texels 52, 53, 54, 55, 56, 57, 58, and 59 of the texel array 90 of even layer of the second texture are read from the 3D graphic engine 11, the texels 8, 9, 10, 11 are outputted from the ninth cache memory 81, which stores the content of the odd rows of the texel array 87 of odd layer of the first texture, the texels 4, 5, 6, and 7 are outputted from the tenth cache memory 82, which stores the content of the even rows of the texel array 87 of odd layer of the first texture, the texels 24, 25, 26, and 27 are outputted from the eleventh cache memory 83, which stores the content of the odd rows of the texel array 88 of even layer of the first texture, and texels 20, 21, 22, and 23 are outputted from the twelfth cache memory 84, which stores the content of the even rows of the texel array 88 of even layer of the first texture, the texels 40, 41, 42, and 43 are outputted from the thirteenth cache memory 95, which stores the content of the odd rows of the texel array 89 of odd layer of the second texture, the texels 36, 37, 38, and 39 are outputted from the fourteenth cache memory 96, which stores the content of the even rows of the texel array 89 of odd layer of the second texture, the texels 56, 57, 58, and 59 are outputted from the fifteenth cache memory 97, which stores the content of the odd rows of the texel array 90 of even layer of the second texture, and the texels 52, 53, 54, and 55 are outputted from the sixteenth cache memory 98, which stores the content of the even rows of the texel array 90 of even layer of the second texture. It should be noted that everyone of the ninth to the sixteenth cache memories will output texels by the mapping method of trilinear filtering.

From the above-mentioned embodiments in which the mapping method through a single pixel and single texture, double pixels and single texture, single pixel and double textures, and double pixels and double textures are performed, mapping method of more than double pixels or more than double textures can be deduced a conclusion as follows:

(1) when the cache memory apparatus comprises a first to K-th cache memories when said computer graphic processing system uses mapping methods of accessing K textures and selecting the nearest point, wherein the first cache memory stores the content of a first texture of said array of the image texels, and the K-th cache memory stores the content of the K-th texture of said array of the image texels, in which K is a positive integer which is bigger than one.

(2) when the cache memory apparatus comprises a first to 2K-th cache memories, in which when said computer graphic processing system uses mapping methods of accessing K textures and bilinear filtering, the first cache memory stores the content of odd rows of the first texture of said array of the image texels, the second cache memory stores the content of even rows of a first texture of said array of the image texels, the (2K−1)-th cache memory stores the content of odd rows of the K-th texture of said array of the image texels, and the 2K-th cache memory stores the content of even rows of the K-th texture of said array of the image texels and K is a positive integer which is bigger than one.

(3) when the cache memory apparatus comprises a first to the 4K-th cache memories when said computer graphic processing system uses mapping methods of accessing K textures and trilinear filtering, the first cache memory stores the content of odd rows of odd layers of the first texture of said array of the image texels, the second cache memory stores the content of even rows of odd layer of the first texture of said array of the image texels, the third cache memory stores the content of odd rows of even layer of the first texture of said array of the image texels, the fourth cache memory stores the content of even rows of even layer of the first texture of said array of the image texels, the (4K−3)-th cache memory stores the content of odd rows of odd layer of the K-th texture of said array of the image texels, the (4K−2)-th cache memory stores the content of even rows of odd layer of the K-th texture of said array of the image texels, the (4K−1)-th cache memory stores the content of odd rows of even layer of the K-th texture of said array of the image texels, the 4K-th cache memory stores the content of even rows of even layer of the K-th texture of said array of the image texels.

(4) when the cache memory apparatus comprises a first to 4K-th cache memories and a first to 2K-th multiplexers when said computer graphic processing system uses a mapping method of accessing K textures, in which the first cache memory stores the content of odd rows of the first texture of said array of the image texels when the mapping methods of selecting the nearest point and bilinear filtering are used and the content of odd rows of odd layer of said array of the image texels when the mapping method of trilinear filtering is used; the second cache memory stores the content of even rows of the first texture of said array of the image texels when the mapping methods of selecting the nearest point and bilinear filtering are used and the content of even rows of odd layer of the first texture of said array of the image texels when the mapping method of trilinear filtering is used; the third cache memory stores the content of odd rows of the first texture of said array of the image texels when the mapping methods of selecting the nearest point and bilinear filtering are used and the content of odd rows of even layer of the first texture of said array of the image texels when the mapping method of trilinear filtering is used; the fourth cache memory stores the content of even rows of the first texture of said array of the image texels when the mapping methods of selecting the nearest point and bilinear filtering are used and the content of even rows of even layer of the first texture of said array of the image texels when the mapping method of trilinear filtering is used; by the same rule, the (4K−3)-th cache memory stores the content of odd rows of the K-th texture of said array of the image texels when the mapping methods of selecting the nearest point and bilinear filtering are used and the content of odd rows of odd layer of the K-th texture of said array of the image texels when the mapping method of trilinear filtering is used; the second cache memory stores the content of even rows of the K-th texture of said array of the image texels when the mapping methods of selecting the nearest point and bilinear filtering are used and the content of even rows of odd layer of the K-th texture of said array of the image texels when the mapping method of trilinear filtering is used; the third cache memory stores the content of odd rows of the K-th texture of said array of the image texels when the mapping methods of selecting the nearest point and bilinear filtering are used and stores the content of odd rows of even layer of the K-th texture of said array of the image texels when the mapping method of trilinear filtering is used; the fourth cache memory stores the content of even rows of the K-th texture of said array of the image texels when the mapping methods of selecting the nearest point and bilinear filtering are used and stores the content of even rows of even layer of the K-th texture of said array of the image texels when the mapping method of trilinear filtering is used; said first multiplexer connected to the third cache memory selects the address of the first and second image texels of the first texture, or called it as the first group containing one fourth image texels when the mapping methods of selecting the nearest point and bilinear filtering are used, and selects the address of the fifth and sixth image texels of the first texture, or called it as third group containing one fourth image texels when the mapping method of trilinear filtering is used; the second multiplexer connected to the fourth cache memory selects the address of the third and fourth image texels of the first texture, or called it as second group containing one fourth image texels when the mapping methods of selecting the nearest point and bilinear filtering are used, and selects the address of the seventh and eighth image texels of the first texture, or called it as fourth group containing one fourth image texels when the mapping method of trilinear filtering is used; by the same rule, said (2K−1)-th multiplexer connected to the (4K−1)-th cache memory selects the address of the first and second image texels of the first texture, or called it as first group containing one fourth image texels of the K-th texture when the mapping methods of selecting the nearest point and bilinear filtering are used, and selects the address of the fifth and sixth image texels of the first texture, or called it as third group containing one fourth image texels of the K-th texture when the mapping method of trilinear filtering is used; the 2K-th multiplexer connected to the fourth cache memory selects the address of the third and fourth image texels of the first texture, or called it as second group containing one fourth image texels of the K-th texture when the mapping methods of selecting the nearest point and bilinear filtering are used, and selects the address of the seventh and eighth image texels of the first texture, or called it as fourth group containing one fourth image texels of the K-th texture when the mapping method of trilinear filtering is used.

(5) when the cache memory apparatus comprises a first to 2K-th cache memories when said computer graphic processing system uses a mapping method of accessing K textures, the first cache memory stores the content of odd rows of the first texture of said array of the image texels when the mapping methods of selecting the nearest point and bilinear filtering are used and the content of odd rows of the odd layer and the even layer of the first texture of said array of the image texels when the mapping method of trilinear filtering is used, the second cache memory stores the content of even rows of the first texture of said array of the image texels when the mapping methods of selecting the nearest point and bilinear filtering are used and the content of even rows of the odd layer and the even layer of the first texture of said array of the image texels when the mapping method of trilinear filtering is used; by the same rule, the (2K−1)-th cache memory stores the content of odd rows of the K-th texture of said array of the image texels when the mapping methods of selecting the nearest point and bilinear filtering are used and the content of odd rows of the odd layer and the even layer of the K-th texture of said array of the image texels when the mapping method of trilinear filtering is used, the second cache memory stores the content of even rows of the K-th texture of said array of the image texels when the mapping methods of selecting the nearest point and bilinear filtering are used and the content of even rows of the odd layer and the even layer of the K-th texture of said array of the image texels when the mapping method of trilinear filtering is used; and K is a positive integer which is bigger than one.

(6) when said computer graphic processing system uses a method of accessing G pixels, the cache memories each have 2G data ports; and G is a positive integer.

The above-described embodiments of the present invention are intended to be illustrated only. Numerous alternative embodiments may be devised by those skilled in the art without departing from the scope of the following claims.

What is claimed is:

1. A cache memory apparatus for texture mapping, applied in a computer graphic processing system storing an array of image texels which form at least one texture, said apparatus comprising one or more cache memories, each of said cache memories storing a part of said array of the image texels according to the row number of said array of the image texels respectively so as to reduce the area occupied by said cache memories in said graphic processing system, wherein the cache memory apparatus comprises:

a first to fourth cache memories and a first to second multiplexers when said computer graphic processing system uses a mapping method of accessing one texture, in which the first cache memory stores the content of odd rows of said array of the image texels when the mapping methods of selecting the nearest point and bilinear filtering are used and the content of odd rows of odd layers of said array of the image texels when the mapping method of trilinear filtering is used, the second cache memory stores the content of even rows of said array of the image texels when the mapping methods of selecting the nearest point and bilinear filtering are used and stores the content of even rows of odd layers of said array of the image texels when the mapping method of trilinear filtering is used, third cache memory stores the content of odd rows of said array of the image texels when the mapping methods of selecting the nearest point and bilinear filtering are used and stores the content of odd rows of even layers of said array of the image texels when the mapping method of trilinear filtering is used, and the fourth cache memory stores the content of even rows of said array of the image texels when the mapping methods of selecting the nearest point and bilinear filtering are used and the content of even rows of even layers of said array of the image texels when the mapping method of trilinear filtering is used, said first multiplexer being connected to the third cache memory to select the addresses of a first group containing one fourth image texels when the mapping methods of selecting the nearest point and bilinear filtering are used and select the addresses of a third group containing one fourth image texels when the mapping method of trilinear filtering is used and the second multiplexer being connected to the fourth cache memory to select the addresses of a second group containing one fourth image texels when the mapping methods of selecting the nearest point and bilinear filtering are used and select the addresses of a fourth group containing one fourth image texels when the mapping method of trilinear filtering is used.

2. A cache memory apparatus for texture mapping, applied in a computer graphic processing system storing an array of image texels which form at least one texture, said apparatus comprising one or more cache memories, each of said cache memories storing a part of said array of the image texels according to the row number of said array of the image texels respectively so as to reduce the area occupied by said cache memories in said graphic processing system, wherein the cache memory apparatus comprises:

a first to 4K-th cache memories and a first to 2K-th multiplexers when said computer graphic processing system uses a mapping method of accessing K textures, in which the first cache memory stores the content of odd rows of the first texture of said array of the image texels when the mapping methods of selecting the nearest point and bilinear filtering are used and selects the content of odd rows of odd layers of said array of the image texels when the mapping method of trilinear filtering is used; the second cache memory stores the content of even rows of the first texture of said array of the image texels when the mapping methods of selecting the nearest point and bilinear filtering are used and selects the content of even rows of odd layers of the first texture of said array of the image texels when the mapping method of trilinear filtering is used; the third cache memory stores the content of odd rows of the first texture of said array of the image texels when the mapping methods of selecting the nearest point and bilinear filtering are used and selects the content of odd rows of even layers of the first texture of said array of the image texels when the mapping method of trilinear filtering is used; the fourth cache memory stores the content of even rows of the first texture of said array of the image texels when the mapping methods of selecting the nearest point and bilinear filtering are used and the content of even rows of even layers of the first texture of said array of the image texels when the mapping method of trilinear filtering is used; the (4K–3)-th cache memory stores the content of odd rows of the K-th texture of said array of the image texels when the mapping methods of selecting the nearest point and bilinear filtering are used and stores the content of odd rows of odd layers of the K-th texture of said array of the image texels when the mapping method of trilinear filtering is used; the (4K–2)-th cache memory stores the content of even rows of the K-th texture of said array of the image texels when the mapping methods of selecting the nearest point and bilinear filtering are used and stores the content of even rows of odd layers of the K-th texture of said array of the image texels when the mapping method of trilinear filtering is used; the (4K–1)-th cache memory stores the content of odd rows of the K-th texture of said array of the image texels when the mapping methods of selecting the nearest point and bilinear filtering are used and stores the content of odd rows of even layers of the K-th texture of said array of the image texels when the mapping method of trilinear filtering is used, the (4K)-th cache memory stores the content of even rows of the K-th texture of said array of the image texels when the mapping methods of selecting the nearest point and bilinear filtering are used and the content of even rows of even layers of the K-th texture of said array of the image texels when the mapping method of trilinear filtering is used; said first multiplexer connected to the third cache memory selects the addresses of the first group containing one fourth image texels when the mapping methods of selecting the nearest point and bilinear filtering are used and selects the addresses of the third group containing one fourth image texels when the mapping method of trilinear filtering is used; the second multiplexer connected to the fourth cache memory selects the addresses of the second group containing one fourth image texels when the mapping methods of selecting the nearest point and bilinear filtering are used and selects the addresses of the fourth group containing one fourth image texels when the mapping method of trilinear filtering is used; said (2K–1)-th multiplexer connected to the (4K–1)-th cache memory selects the addresses of the first group containing one fourth image texels of the K-th texture when the mapping methods of selecting the nearest point and bilinear filtering are used and selects the addresses of the third group containing one fourth image texels of the K-th texture when the mapping method of trilinear filtering is used; the 2K-th multiplexer connected to the the (4K)-th cache selects the addresses of the second group containing one fourth image texels of the K-th texture when the mapping methods of selecting the nearest point and bilinear filtering are used and selects the addresses of the fourth group containing one fourth image texels of the K-th texture when the mapping method of trilinear filtering is used.

3. A cache memory apparatus for texture mapping, applied in a computer graphic processing system storing an array of image texels which form at least one texture, said apparatus comprising one or more cache memories, each of said cache memories storing a part of said array of the image texels according to the row number of said array of the image texels respectively so as to reduce the area occupied by said cache memories in said graphic processing system, wherein the cache memory apparatus comprises:

a first and second cache memories when said computer graphic processing system uses a mapping method of accessing one texture, the first cache memory stores the content of odd rows of said array of the image texels when the mapping methods of selecting the nearest point and bilinear filtering are used and stores the content of odd rows of the odd layers and the even layers of said array of the image texels when the mapping method of trilinear filtering is used, the second cache memory stores the content of even rows of said array of the image texels when the mapping methods of selecting the nearest point and bilinear filtering are used and stores the content of even rows of the odd layers and the even layers of said array of the image texels when the mapping method of is trilinear filtering is used.

4. A cache memory apparatus for texture mapping, applied in a computer graphic processing system storing an array of image texels which form at least one texture, said apparatus comprising one or more cache memories, each of said cache memories storing a part of said array of the image texels according to the row number of said array of the image texels respectively so as to reduce the area occupied by said cache memories in said graphic processing system, wherein the cache memory apparatus comprises:

a first to 2K-th cache memories when said computer graphic processing system uses a mapping method of accessing K textures, the first cache memory stores the content of odd rows of the first texture of said array of the image texels when the mapping methods of selecting the nearest point and bilinear filtering are used and stores the content of odd rows of the odd layers and the even layers of the first texture of said array of the image texels when the mapping method of trilinear filtering is used, the second cache memory stores the content of even rows of the first texture of said array of the image texels when the mapping methods of selecting the nearest point and bilinear filtering are used and stores the content of even rows of the odd layers and the even layers of the first texture of said array of the image texels when the mapping method of trilinear filtering is used; by the same rule, the (2K−1)-th cache memory stores the content of odd rows of the K-th texture of said array of the image texels when the mapping methods of selecting the nearest point and bilinear filtering are used and stores the content of odd rows of the odd layers and the even layers of the K-th texture of said array of the image texels when the mapping method of trilinear filtering is used, the (2K)-th cache cache memory stores the content of even rows of the K-th texture of said array of the image texels when the mapping methods of selecting the nearest point and bilinear filtering are used and stores the content of even rows of the odd layers and the even layers of the K-th texture of said array of the image texels when the mapping method of trilinear filtering is used, and K is a positive integer which is bigger than one.

5. The apparatus of claim 4, which accesses all texels in two cycles when a mapping method of trilinear filtering is used.

* * * * *